United States Patent Office 3,116,176
Patented Dec. 31, 1963

3,116,176
PROCESS FOR THE PRODUCTION OF CORROSION-RESISTANT COATINGS ON ZINC- AND CADMIUM-SURFACES
Helmut Fuchs, Ried Post Tegernau uber Schopfheim, Germany, assignor to A. Raymond Druckknopf- und Metallwarenfabrik
No Drawing. Filed Sept. 25, 1959, Ser. No. 842,183
Claims priority, application Germany May 14, 1959
3 Claims. (Cl. 148—6.2)

The invention relates to the production of corrosion-, wipe-, scratch- and moisture-resistant chrome coatings on zinc and cadmium surfaces.

A passivating after-treatment of zinc- or cadmium-clad surfaces is known. Passivation, as a rule, is accomplished by a treatment of these surfaces with dilute nitric acid or with a mixture of sulfuric and chromic acids. The latter treatment particularly is widely practiced. Aside from a lightening of the color of these surfaces and increased gloss, a considerable passivation is effected by such a treatment.

The corrosion resistance caused by the passivation is based on the formation of frequently extremely thin chromate layers on the cadmium- or zinc-clad surfaces, and the corrosion protection is due to the fact that the chromate layer is resistant to the corroding carbon dioxide present in the air. The chromate layer also retards attacks by sulfurous acid present especially in industrial areas, since the sulfurous acid first must reduce the chromate layer before acting deleteriously upon the zinc and its carrier. The corrosion-inhibiting effect of the chromate layer depends on its thickness, its density and the adhesion to the substrate.

The surfaces, after such an after-treatment, display colorations ranging from a slightly irridescent yellow to non-uniform spotted yellow to more or less uniform olive yellow or olive green. The processes hitherto known have the disadvantage that the layers, produced from aqueous solutions, adhere to the surfaces very loosely and are not resistant to wiping as long as the articles thus treated are still wet or damp. Only after drying, preferably forced drying with hot air, a certain amount of wipe-resistance is attained. However, even after drying, the chromate layer offers sufficient protection only as the articles thus coated are not exposed to moisture or even dampness. If exposed to corroding influences in the presence of moisture or dampness, the coatings or layers are destroyed and rapidly dissolved even after a very short time. This drawback hitherto has prevented a satisfactory application of the passivation process especially zinc- or cadmium-clad surfaces, such as small iron articles, stamped parts, etc.

Another drawback of that process resides in the fact that the acidic chromic acid baths are spent very rapidly and must be replenished after a short working time. This is expensive and uneconomical. The rapid irreversible depletion of the baths is based on the fact that, upon treating, e.g., zinc-clad articles, the nascent hydrogen formed according to the Equation 1

$$Zn + 2H' = Zn^{++} + H_2 \quad (1)$$

reduces the hexavalent chromium of the chromic acid which, at a lower valency, is no longer capable of forming complexes.

The process according to the invention overcomes these disadvantages and effects a well-adhering chromate coating on zinc- and cadmium-clad surfaces. These coatings or layers are wipe- and scratch-resistant without a drying treatment and opportunely can be applied to mass-produced small articles without destroying this passivation layer when these articles rub against each other. Moreover, the color of these coatings remains largely constant so that this coating simultaneously can be applied for the purpose of imparting color to the surfaces thus treated. Furthermore, the treating baths deplete only very slowly and can be regenerated rapidly and easily.

The process according to the invention attains a well-adhering coating by treating the zinc- or cadmium-clad articles with chromic acid solutions which contain at least 30 percent, calculated on the weight chromic acid present, of chlorine ions, buffering substances for adjusting the pH and stabilizers for the stabilization of the redox potential of the solution.

The treatment with these chromic acid solutions preferably is carried out at the boiling temperature of the treating baths. The duration of the treatment is 1 to 10 minutes, and usually 2 to 3 minutes.

The conditions required to attain a well-adhering coating are attained by the addition of chlorine ions, buffers and stabilizers. This has the effect that only as many zinc or cadmium ions from the respective surfaces go into solution as are needed for the formation of a continuous coating and that the zinc and cadmium ions going into solution immediatley, in statu nascendi, form insoluble complexes.

The chlorine ions preferably are formed from alkali chlorides. However, in practice, all chlorides can be employed which are soluble and dissociated in chromic acid solutions.

The buffers serve to adjust the pH values of the solution. They preferably consist of the chlorides of weak bases, and the pH of the solution preferably lies between 2 and 3. As stabilizers preferably potassium nitrate and/or potassium chlorate are used. However, all other stabilizers are suitable which adjust the redox potential of the solution in the desired manner.

The effects occurring on the surfaces to be passivated can be expressed in the following Equation 2:

$$Zn + MeCl + \tfrac{1}{2}O_2 + H_2O = Me_2(ZnCl_4) + 2MeOH \quad (2)$$

Oxygen is supplied by the chromic acid which through the solution of the zinc is reduced and, together with the zinc, forms an insoluble zinc complex. The complex formation takes place according to the following Equation 3:

$$Zn + 4MeCl + 2H_2Cr_2O_7 = Me_4(ZnCl_4 \cdot Cr_4O_{12}) + 2H_2O \quad (3)$$

During the passivation of a cadmium surface, the corresponding reactions occur.

The chromate coatings produced by the process according to the invention have an olive-yellow hue, adhere even in the boiling solution and represent an excellent protection against corrosion. These coatings are practically resistant to salt water and repel water. The thickness of the coating layer depends upon the duration of the treatment and upon the concentration of the bath and can be varied at will within wide limits.

In the following, a number of examples is presented, illustrating compositions of suitable passivating and coating baths for cadmium- and zinc-clad surfaces. However, it should be understood that these are given merely by way of explanation, not of limitation, and that numerous changes may be made in the details without departing from the spirit and the scope of the invention as hereinafter claimed.

*Example 1*

|  | G./l. |
|---|---|
| $CrO_3$ | 8 |
| NaCl | 4 |
| $KNO_3$ | 8 |
| $NH_4Cl$ | 10 |

*Example 2*

|  | G./l. |
|---|---|
| $CrO_3$ | 8 |
| NaCl | 8 |
| $NH_4Cl$ | 10 |
| $KNO_3$ | 5 |
| $KClO_3$ | 4 |

I claim as my invention:

1. A process for the production of wipe-, scratch-, moisture- and corrosion-resistant coatings on zinc- and cadmium-clad surfaces, which comprises immersing said surfaces in a boiling chromic acid solution consisting essentially of at least 30 percent chlorine ions, calculated on the weight of the chromic acid, said chromic acid and chlorine ions being present in said solution in molar ratios of $CrO_3$ to chlorine of substantially 1:3 to 1:4; ammonium chloride as buffering substances; and oxidizing agents; said buffering substance maintaining a pH of 2–3 in said solution; and said oxidizing agents fixing the redox potential of said solution.

2. A process for the production of wipe-, scratch-, moisture- and corrosion-resistant coatings on zinc- and cadmium-clad surfaces, which comprises immersing said surfaces for 1 to 10 minutes in a boiling chromic acid solution consisting essentially of at least 30 percent chlorine ions, calculated on the weight of the chromic acid, said chromic acid and chlorine ions being present in said solution in molar ratios of $CrO_3$ to chlorine of substantially 1:3 to 1:4; ammonium chloride as buffering substance; and oxidizing agents; said buffering substance maintaining a pH of 2–3 in said solution; and said oxidizing agents fixing the redox potential of said solution.

3. A process for the production of wipe-, scratch-, moisture- and corrosion-resistant coatings on zinc- and cadmium-clad surfaces, which comprises immersing said surfaces for 1–10 minutes in a boiling chromic acid solution, consisting essentially of at least 30 percent chlorine ions, calculated on the weight of the chromic acid, said chromic acid and chlorine ions being present in said solution in molar ratios of $CrO_3$ to chlorine of substantially 1:3 to 1:4; ammonium chloride as buffering substance; and an oxidizing agent selected from the group consisting of potassium nitrate, potassium chlorate, and mixtures thereof; said buffering substance maintaining a pH of 2–3 in said solution; and said oxidizing agent fixing the redox potential of said solution.

References Cited in the file of this patent

UNITED STATES PATENTS

| 2,106,904 | Wilhelm | Feb. 1, 1938 |
| 2,393,665 | Taylor | Jan. 29, 1946 |
| 2,864,730 | Kinder et al. | Dec. 16, 1958 |

FOREIGN PATENTS

| 714,541 | Great Britain | Sept. 1, 1956 |